June 28, 1966 W. R. SNELLER 3,257,965
LOAD SUSPENSION FROM CABLE
Filed Aug. 31, 1964 2 Sheets-Sheet 2
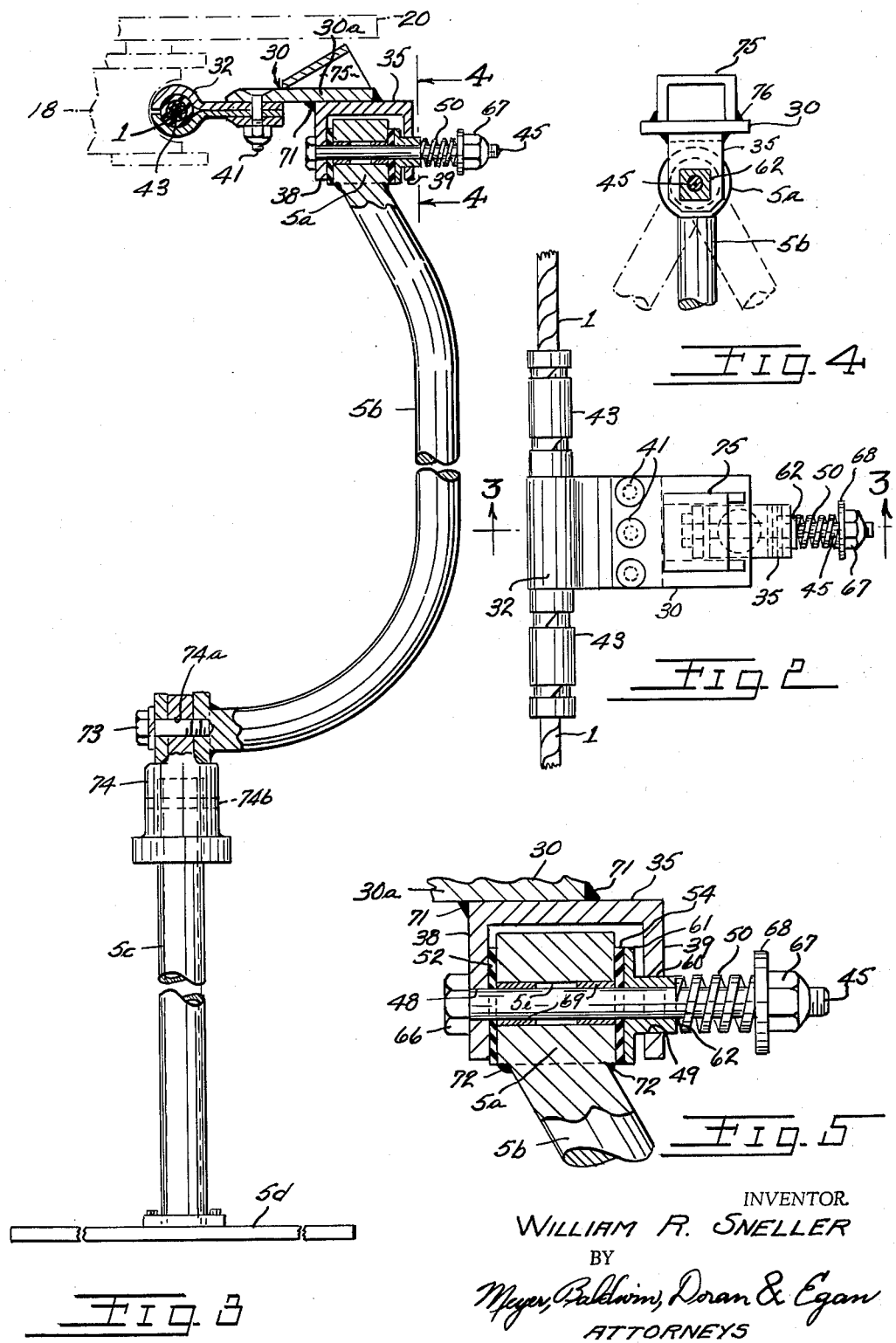
INVENTOR.
WILLIAM R. SNELLER
BY
Meyer, Baldwin, Doran & Egan
ATTORNEYS

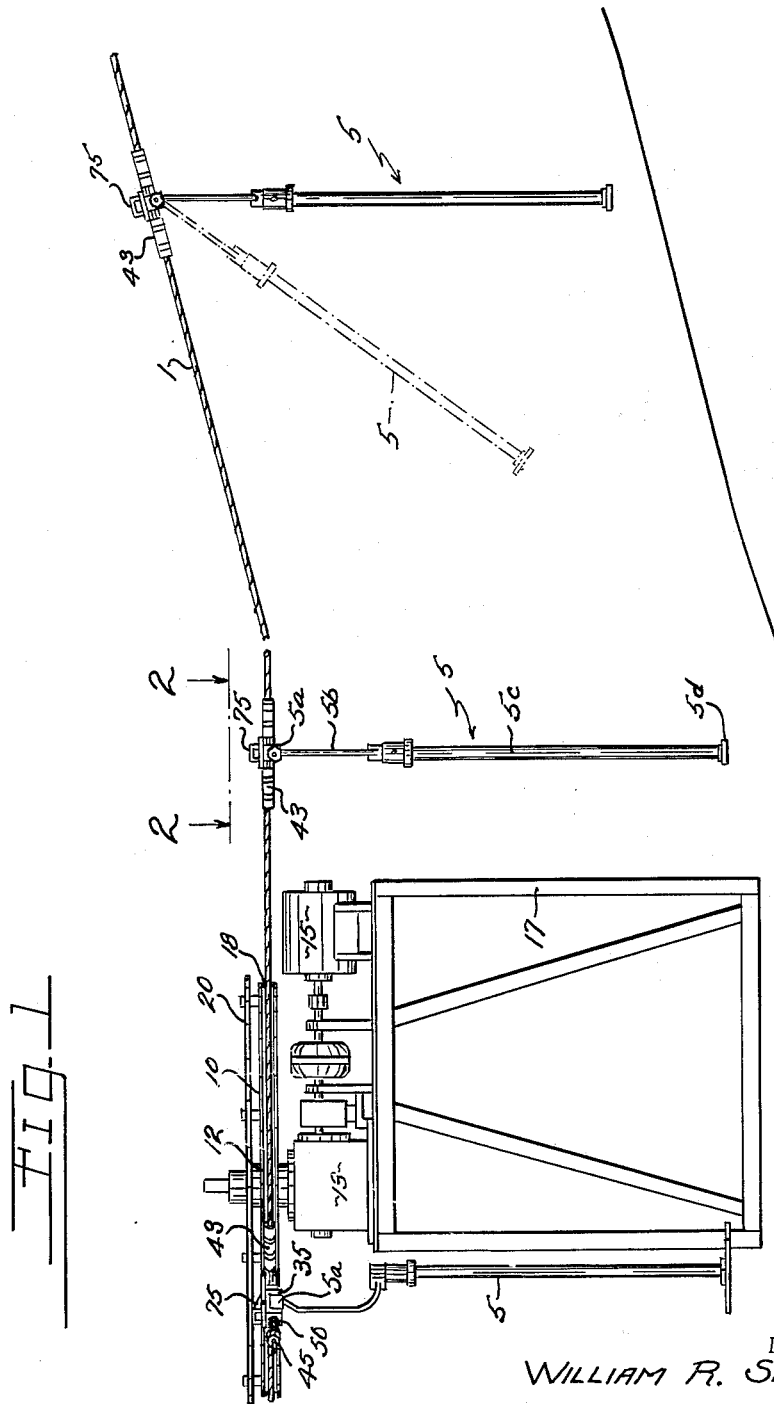

United States Patent Office 3,257,965
Patented June 28, 1966

3,257,965
LOAD SUSPENSION FROM CABLE
William R. Sneller, 21800 St. Clair Ave., Cleveland, Ohio
Filed Aug. 31, 1964, Ser. No. 393,176
6 Claims. (Cl. 104—173)

This invention relates to an assembly for fastening a bar to an endless cable for suspending a weight therebelow.

When a load is removed from a bar that is suspended from an endless cable, such as in the case of a skier letting go of a ski tow bar, generally there is a swinging reaction set up in the bar. In the case of a ski tow bar, one end of the bar is generally pivotably mounted to the cable so that unrestricted pivotal movement or swinging of the bar is dangerous and also places a strain on the pivot mounting structure connected said bar and said cable, and sometimes prevents proper movement of the bar around the bullwheel. Hence, dampening of such unrestricted swinging and reduction of such strain on the structure connected the bar and cable is of great advantage.

Also, in combination of an endless cable for carrying a bar for suspending a load below the cable and a bullwheel with a track for reversing the direction of the cable, sometimes difficulty is encountered in keeping said cable on the track and, therefore, much time and expense is saved if said cable can be kept on such track.

It is an object of the present invention to provide an assembly including clamping means for mounting on an endless cable a bar for suspending a weight therebelow, means for pivotably mounting said bar to the cable and adjusting means for adjusting the amount of pivotal movement of said bar.

It is an object of the present invention to provide in combination with an endless cable and a bar for suspending a weight below said cable an assembly comprising clamping means for fastening the bar to the cable, the clamping means including a housing for pivotably mounting the bar therewithin, and adjusting means for adjusting the pivotal movement of the bar and hence dampen the swinging movement thereof.

It is also an object of the present invention to provide in combination with an endless cable and a bullwheel track for reversing the direction of the cable, an annular flange mounted above and spaced radially outwardly from the track, means for attaching a load-suspending bar below said cable, the means comprising a clamp end attachable to said cable and a bumper on said bar-supporting end positioned close to the flange whereby said bumper engages said flange upon a swinging movement of the bar in a direction outwardly of said track, the engagement of said bumper with the flange keeping the cable on the track.

It is an object of the present invention to provide in combination with an endless cable for a ski tow and a tow bar for towing skiers uphill, an assembly comprising clamping means for fastening the bar to the cable including a clamp end and including a housing member, mounting means for pivotably mounting one end of the bar within the housing member of the clamping means, and adjusting means for adjusting the amount of pivotal movement of the bar, the adjusting means including a spring that biases one side of the bar end towards one of the walls of the housing member to thereby dampen the pivotal movement of the bar.

These and other objects will become apparent from the specification that follows, the appended claims, and the drawings, in which:

FIG. 1 is a fragmentary side elevational view of an endless cable, a bar suspended from the cable that is adapted to tow skiers uphill, and an assembly for pivotably mounting an end of the bar to the cable, said assembly embodying the present invention;

FIG. 2 is a fragmentary enlarged top plan view of the assembly for fastening one end of the bar to the cable including clamping means having a clamp end and a housing at the other end for pivotably mounting said one end of the bar therewith;

FIG. 3 is a fragmentary elevational view partly broken away in section and taken along the line 3—3 indicated in FIG. 2;

FIG. 4 is a fragmentary sectional view taken along the line 4—4 in FIG. 3 and indicating in dot-dash lines the position of the bar during various portions of its pivotal movement; and FIG. 5 is a fragmentary enlarged view of the housing end of the clamping means with parts broken away and shown in section, said view showing the pivotal connection of the bar end within the housing end and adjusting means for adjusting pivotal movement of said bar.

The present invention provides an assembly for pivotably mounting one end of a bar to an endless cable and adjusting the pivotal movement of the bar, the assembly comprising clamping means for clamping one end of the bar to the cable, said means including a housing for pivotably mounting the bar therewithin; and adjusting means for adjusting the pivotal movement of said bar whereby the swinging motion of the bar is dampened as desired.

The present invention also provides bumper means for keeping an endless cable on a bullwheel track, the bumper means being located on clamping means for clamping a bar to the cable for suspending a load therebelow, the bumper means being adapted to engage an annular flange spaced upwardly and outwardly from the track upon a swinging movement of the bar outwardly from the track.

As specifically illustrated in the accompanying drawings, the endless cable, bar and assembly for pivotably mounting the bar on the cable are especially well suited for use as a ski tow for towing skiers uphill.

As seen in FIG. 1, an endless cable 1 is provided with a plurality of ski tow bars 5 for towing a skier uphill.

As seen in FIG. 1 or 3, the embodiment of the bar therein shown comprises an upper bar end 5a, an upper generally C-shaped section 5b having an end connection to the end 5a, a relatively straight section 5c and a crossbar 5d connected on the lower end of the section 5c.

As shown in FIG. 1, a bullwheel or sheave 10 is shown near the bottom of a slope, the bullwheel being driven by a shaft 12 which is turned by a drive mechanism that includes gear box 13 and a motor 15, the drive mechanism being mounted on a frame 17. The bullwheel includes a track 18 and an annular flange 20 mounted above said track and spaced radially outwardly therefrom.

As previously indicated, a plurality of tow bars 5 are shown mounted below the cable 1 in FIG. 1. In the right hand side of FIG. 1, one of the positions of the bar 5 that it may reach during its pivotal movement is illustrated in dot-dash lines.

In combination with said cable 1 and tow bar 5, there is provided an assembly for pivotably mounting the bar to the cable, the assembly comprising clamping means for fastening the bar to the cable including a clamp member 30 having a clamp end 32 and a housing member 35 having spaced parallel walls 38 and 39 for pivotably mounting one end 5a of the bar therewithin. The clamp end 32 can be tightened over the cable 1 by any suitable fastening means such as a plurality of bolts 41. There may be provided between said clamp end 32 and the cable 1 a sleeve 43 of crimped metal to give a tighter grip and to prevent and reduce wear on the clamped portion of the cable.

Means for pivotably mounting the bar end 5a within the housing member 35 is provided including a threaded bolt 45 that suspends the bar end 5a within the housing by passing through opening 5e in the bar and openings 48 and 49 in the housing side walls, 38 and 39, respectively.

Means for adjusting the pivotal movement of the bar is provided, the adjusting means including a helical spring 50 embracing the bolt that biases the bar end 5a along the bolt 45 towards a portion of the housing wall 38 to dampen or restrict the pivoting action of said bar end around the bolt.

As best seen in FIGS. 3 and 5, tough yet resilient washers 52 and 54 that are preferably made of nylon surround the bolt on opposite sides of the bar end 5a and are located between the bar end and the housing walls 38 and 39.

A spacer member 60 is provided and a circular end flange portion 61 thereof is located within the housing and adjacent the washer 54, the flange portion 61 resembling a disc that bears against the washer 54 when the spring slides the bar end 5a along the bolt toward the housing wall 38. As best seen in FIGS. 4 and 5, the spacer member 60 is provided with a square end 62 having a square cross section, the end 62 being snugly located within the square opening 49 of the housing wall 39. Thus, the spacer member 60 is non-pivotally mounted within the housing and has motion only in a direction along the bolt. Hence, the exact location of the spacer member depends upon the force exerted against its square end 62 by the spring 50. As seen in FIGS. 2, 3 and 5, a nut 66 is provided on one end of the bolt and this nut is tightened against the outside surface of housing wall 38. Also, a nut 67 and a washer 68 are provided near the other end of the bolt, the washer engaging the outer end of the spring. The nut 67 can be turned toward or away from the spring to thereby increase or decrease, respectively, the force against the spacer member and, hence, the pivoting action of the bar end 5a can be dampened by such friction to any desired degree by adjusting the position of nut 67 on the threaded bolt 45.

It can be seen in FIG. 5 that both nylon washers 52 and 54 are squeezed around the bar end 5a, which end is sandwiched therebetween, to allow the bar end only a retreaded swinging action.

As best seen in FIG. 5, a sleeve bearing 69 is provided around the bolt 45 at each end of the opening 5e in the bar end 5a to facilitate the pivoting of the bar end around said bolt when a load is released from the bar 5 such as, for instance, when a skier lets go of the bar when he completes his ride up the slope.

Although the clamp end and the housing member 35 of the clamping means can be fastened together in any suitable manner, the parts are preferably welded together as indicated at 71 in the drawings or otherwise made unitary. Also, the bar end 5a can be welded to the tow bar section 5b as indicated at 72 and as best seen in FIGS. 3 and 5. Likewise, the tow bar sections 5b and 5c can be rigidly connected by any suitable fastening means such as the means shown in FIG. 3 in which a bolt 73 passes through an opening 74a in the upper portion of a bell-shape connector 74 to secure said connector to the lower end of bar section 5b. By releasing a pin 74b, the straight bar section 5c can be easily released for repairs or another type of towing device such as a chair can be quickly and conveniently substituted for the bar 5c and cross bar 5d.

As noted in FIGS. 3, 4 and 5, a bumper 75 is provided on the clamping means and preferably welded thereto as indicated at 76 in FIG. 4.

As seen, for instance in FIG. 3, in the combination of the endless cable 1 and bullwheel track 18 for reversing the direction of the cable, the annular flange 20 is provided above the track and is spaced radially outwardly therefrom. The bumper 75, which is connected to a central bar-supporting portion 30a of the clamping means that is located generally between the clamp end 32 and housing member 35, engages the flange 20 upon a swinging motion of the bar in a direction radially outwardly from the bullwheel to thereby keep said cable on the track.

It is to be understood that the above description is by way of illustration rather than limitation and that, in accordance with the provisions of the patent statutes, variations and modifications of the specific devices disclosed herein may be made without departing from the spirit of the invention.

What is claimed is:

1. An assembly for pivotably mounting one end of a bar to an endless cable and dampening the pivotal movement of said bar, the assembly comprising clamping means for clamping one end of the bar to the cable, said clamping means including a housing for pivotably mounting the bar end therewithin, and dampening means for snubbing the pivotal movement of said bar end in a plane generally parallel to a vertical plane through the longitudinal axis of the cable, said dampening means being mounted on and within said housing.

2. An assembly for pivotably mounting one end of a tow bar to an endless ski tow cable and dampening the pivotal movement of said bar, the assembly comprising clamping means for clamping one end of the tow bar to the cable, said clamping means including a housing for pivotably mounting the bar end therewithin, and adjustable dampening means for snubbing the pivotal movement of said bar, said dampening means being mounted on and within said housing, said dampening means including a bolt that connects said housing and said bar, the dampening means also including a washer located between one end of said bar and one side of said housing, and a spring that biases said bar along said bolt towards said washer and said one side of the housing to contact said washer and said one side and thus to dampen the pivoting action of said bar in a plane through the longitudinal axis of the cable.

3. An assembly for pivotably mounting one end of a tow bar to an endless ski tow cable and dampening the pivotal movement of said bar, the assembly comprising clamping means for clamping one end of the tow bar to the cable, said assembly including a housing for pivotably mounting the bar end therewithin, and adjustable friction dampening means for dampening the pivotal movement of said bar in a plane generally parallel to a vertical plane through the longitudinal axis of the cable, said dampening means including a bolt that connects said housing and said bar end, said dampening means also including a first washer between one side of said housing and said one end of said end bar and a spring that biases said bar end along said bolt toward said one side of the housing to contact the washer located therebetween with said one side to dampen the pivoting action of said bar in a plane generally parallel to a vertical plane through the longitudinal axis of the cable, there being a second washer on the side of the mounted bar end opposite the first washer, and a nonpivoting spacer member, a portion of said spacer member being on said opposite side of said bar end, located adjacent the second washer, the spacer member having one end that passes through an opening in the housing and is nonpivotably mounted therewithin, the spring contacting said end of the spacer member that passes through the housing opening and being operable to slide the spacer member against said second washer and said bar end to bias the bar end towards the first washer and the housing wall opposite said spacer member.

4. In combination with an endless cable for a ski tow and a tow bar for towing skiers uphill, an assembly comprising clamping means for fastening the bar to the cable including a clamp and a housing member, mounting means for pivotably mounting one end of the bar within the housing member of the clamping means, and adjustable dampening means for adjustably dampening the amount of pivotal movement of the bar, said dampening means being mounted on and within said housing, said dampening means including a bolt that connects said housing and said bar end, the dampening means also including a washer located between said end of said bar and one side of said housing, and a spring that biases said bar end along said bolt toward said washer and said one side of the housing to contact said washer and said one side and thus to dampen the pivoting action of said bar in a plane through the longitudinal axis of the cable, there being means for adjusting the amount of compression of said spring effective to increase and decrease the pivotal movement of said bar.

5. In combination with an endless cable and a bar for suspending a weight below said cable, an assembly comprising clamping means for fastening the bar to the cable including a clamp and a housing member having spaced parallel walls, mounting means for pivotably mounting one end of the bar within the housing of the clamp means, and adjustable dampening means for dampening the amount of pivotal movement of the bar in a plane generally parallel to a vertical plane through the longitudinal axis of the cable, the dampening means including a spring that biases one side of the bar end toward one of said parallel walls of the housing member, there being a bolt passing through said walls and pivotably mounting the bar end within the housing member, a tough resilient washer surrounding the bolt on each side of the bar end, a spacer member located between one of the washers and the other of said parallel walls, the spacer member having a square end mounted within a square opening provided in said other parallel wall and having a flanged end bearing against said one of said washer, the spring compressed between the spacer member and a nut threaded on said bolt outside the housing, whereby the spacer member squeezes said bar end between said washers to dampen the pivotal movement of the bar end in said housing member.

6. In combination with an endless cable for towing skiers uphill, a bullwheel including a track for changing the direction of the cable and a protective flange around said bullwheel and spaced above and generally parallel to said cable track; a tow bar assembly for suspending a load from said cable, said assembly comprising a tow bar, clamping means for clamping said tow bar to the cable, means for pivotably mounting one end of said bar to said clamp means, adjustable dampening means for snubbing the pivotal movement of said bar, said dampening means being mounted on and within said housing, said dampening means including a bolt that connects said housing and said one end of said bar, the dampening means also including a washer located between said end of said bar and one side of said housing, a spring that biases said bar end along said bolt towards said washer and said one side of the housing to contact said washer and said one side thus to dampen the pivoting action of said bar in a plane through the longitudinal axis of the cable, and bumper means on said clamping means radially outwardly from said cable for contacting said protective flange above the bullwheel to prevent said cable from leaving said track.

References Cited by the Examiner

UNITED STATES PATENTS

| | | | |
|---|---|---|---|
| 2,592,898 | 4/1952 | Helberg | 104—178 |
| 2,938,472 | 5/1960 | Tiegel | 104—173 |
| 3,137,245 | 6/1964 | Spector | 104—173 |
| 3,170,412 | 2/1965 | Sowder | 104—173 |

ARTHUR L. LA POINT, *Primary Examiner.*

MILTON BUCHLER, *Examiner.*

F. W. MONAGHAN, *Assistant Examiner.*